UNITED STATES PATENT OFFICE.

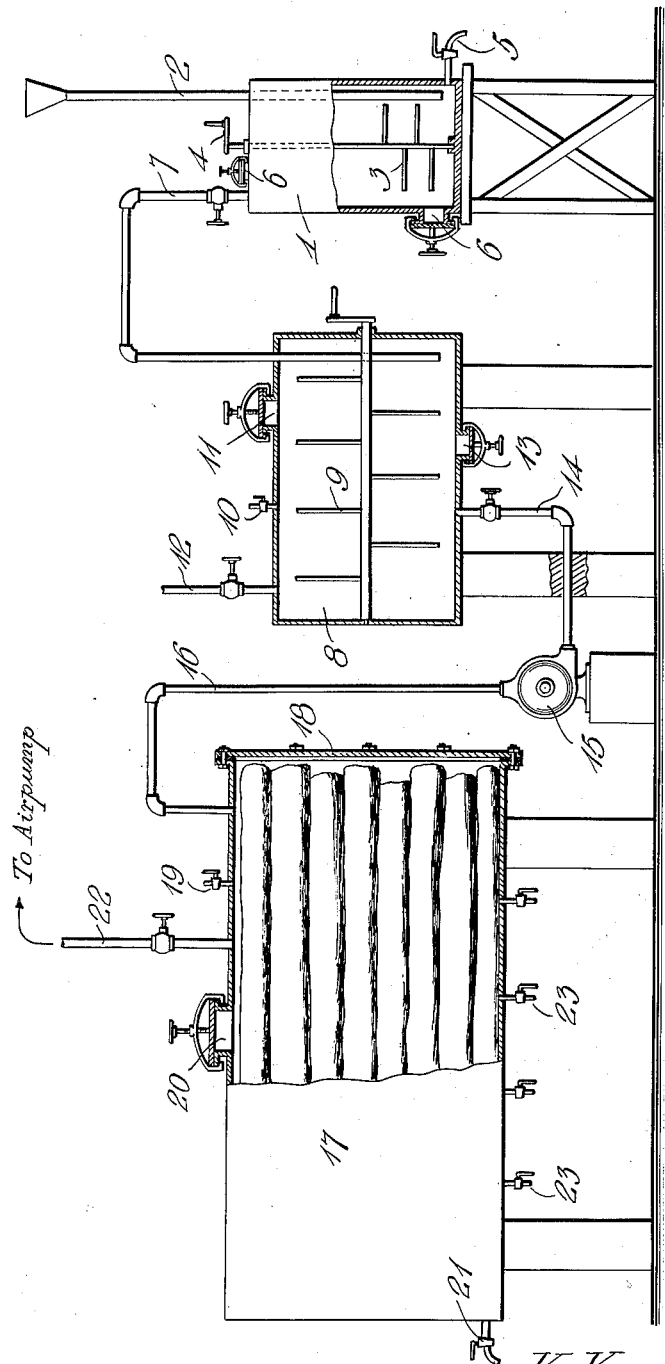

KONSTANTIN KOENMAN, OF BERNARDSVILLE, NEW JERSEY, ASSIGNOR TO FRANK B. ALLEN, OF BERNARD TOWNSHIP, SOMERSET COUNTY, NEW JERSEY.

PROCESS OF PRESERVING WOOD.

1,007,877.  Specification of Letters Patent.  Patented Nov. 7, 1911.

Application filed November 21, 1910. Serial No. 593,510.

*To all whom it may concern:*

Be it known that I, KONSTANTIN KOENMAN, a subject of the Czar of Russia, residing at Bernardsville, in the county of Somerset and State of New Jersey, have invented certain new and useful Improvements in Processes of Preserving Wood; and I do declare the following to be a full, clear, and exact description of the invention, such as will enable others skilled in the art to which it appertains to make and use the same.

My invention relates to the treatment of wood and has especial reference to a process for treating wood to cause it to effectually resist the attacks of teredo and all other species of worms or insects.

The process constituting my invention will be hereinafter first fully described and its novel features will be subsequently particularly pointed out in the claim.

In the annexed drawing I have shown a sectional elevation of a typical apparatus by the use of which my process may be practiced.

My invention consists, primarily, in introducing sulfur in ammonium sulfid, S in $(NH_4)_2S$, into the wood, taking advantage of the solubility of sulfur, S, in ammonium sulfid, $(NH_4)_2S$ which solution has the property of penetrating the entire mass or body of the wood. The sulfur may be dissolved in carbon disulfid $CS_2$, benzol, $(C_6H_6)$, etc., but these solvents are very dangerous and are, moreover, lacking in the power of penetration which is possessed by a solution, scientifically speaking, of sulfur, S, in ammonium sulfid, $(NH_4)_2S$, with free ammonia, $NH_3$, and ammonium hydrosulfid $NH_4HS$.

In carrying out my process, I employ a generator or closed tank, 1, lined with lead and equipped with a filling tube, 2. A stirrer, 3, is provided within this generator and has a handle, 4, or other operating mechanism at its upper end, the shaft of the stirrer being journaled in the top and bottom of the generator as shown. The generator is further provided with a drain cock, 5, and with manholes 6 for introducing solid and for cleaning. From the top of the generator a pipe 7 leads to a mixing vessel or tank 8, and terminates near the bottom of the same. This tank contains a longitudinally disposed horizontal stirrer 9, the shaft of which is journaled in the ends of the tank. The tank is also provided in its top with a nut or pet cock 10 and an inlet, 11 through which dry sulfur may be fed. It is also provided with an inlet 12, through which ammonia water may be supplied. The inlet 11 is in the form of a large nozzle which is closed by a plug or cap and the inlet 12 is in the form of a valved pipe leading from a suitable reservoir or other source of supply. A manhole, 13, is provided in the bottom of the mixing vessel or tank and a discharge pipe 14, leads from said bottom to a pump, 15, connected by a pipe, 16, with a large tank, 17, having a removable end plate, 18, which is fastened to the tank in any convenient manner and, is equipped with packing to form a gas and liquid-tight joint therewith. The tank 17 is further provided with a vent, 19, and a manhole, 20, in its top and with a drain cock, 21, at one end. A pipe, 22, leads from the top of the tank 17 to any preferred form of airpump and a plurality of cocks or valves, 23, are provided at or near the bottom of said tank.

In the generator 1, I place a quantity of iron sulfid, FeS, or calcium sulfid, CaS, upon which sulfuric acid, $H_2SO_4$, is poured. The gas thereby generated pasess through the pipe 7 into the mixing vessel 8 which is filled with strong ammonia, $NH_3$, to which is added ground sulfur S. The sulfur hydrogen gas $H_2S$, coming from the generator 1 is absorbed by the ammonia $NH_3$, and when the liquid is saturated with the gas, the stirrer 9 is rotated so as to agitate the contents of the mixing vessel and cause the sulfur to dissolve. This agitation is continued for several hours and the mixture is then left undisturbed for some time, (about one day) to obtain a thoroughly saturated solution. Should a stronger solution be desired, a small additional amount of gas may be admitted to the mixing vessel on the second day. It will be understood, of course, that if the agitation is delayed for some time after the entrance of gas to the mixing vessel, the stirrer need not be rotated for as long a period as when the agitation is effected immediately after the admission of gas.

In preparing the solution, for every 100 liters of strong ammonia water 17–22% in the still I place in the generator on the first day, from 12 to 15 kilograms of iron sulfid and 16 to 20 kilograms of sulfuric acid, $H_2SO_4$, the strength of which is 66° Baumé, and dilute with 4 or 5 kilograms of water to each kilogram of the solution. On the second day about one-fourth of the stated amounts of iron sulfid and sulfuric acid should be placed in the generator to further saturate the solution in the mixing vessel and to saturate 100 liters of ammonium sulfid, $(NH_4)_2S$, 15 to 20 kilograms of iron sulfid and 20 to 27 kilograms of 66° sulfuric acid, $H_2SO_4$, must be used. To every 100 liters of ammonium sulfid in the mixing vessel 8 to 10 kilograms of ground sulfur are added. From the mixing vessel the saturated fluid is pumped to the tank 17 in which the wood has been previously placed or to a reservoir in which it may be stored for use when needed.

The wood having been placed in the large tank 17 which is hermetically sealed, the saturated fluid is caused to act on the wood either by pressure, impregnation or by absorption. The ordinary method relies on absorption and proceeds as follows:—After the tank is filled with the wood and sealed, the air vent is opened and the fluid pumped in so as to entirely cover the wood, and as the fluid is absorbed by the wood a fresh supply is pumped in so as to keep the wood immersed. The wood is kept in the solution from two to ten days according to its thickness, until it has become thoroughly impregnated. The liquid is then drawn off and may be used again for the same purpose after being strained. After the tank has been drained, the small cocks 23 at the bottom are opened and the air pump is operated to draw air through the tank and to draw moisture from the wood. The oxygen in the air thus admitted to the tank combines with the sulfureted hydrogen remaining in the wood and after the reaction $$(O_2 + 2H_2S = 2H_2O + S_2)$$

produces free sulfur. It may be deemed advisable in some case to use oxygen water to facilitate and increase this production of free sulfur. The operation of the air pump creates a strong draft through the tank which carries off all the gases and partly dries the wood. After the wood has been thus partly dried, it is removed and placed in a kiln or drying room for final drying, the temperature of the drying room being gradually raised to 80° or 100° C. The wood should remain in this temperature from twelve to twenty-four hours according to its thickness and, after cooling, will be ready for use. The wood, may, if desired, be exposed in the open air for a few days before being placed in the drying room. The free sulfur formed in the wood thoroughly covers the fiber of the wood throughout the mass of the same and becomes intimately joined therewith so that the wood acquires the rock-like solidity, hardness, and durability of petrified wood. The wood treated by my process may be used for railroad ties, piles, or many other structures in which durability is essential.

In preparing the ammonium sulfid, when the sulfureted hydrogen begins to saturate the ammonia water in the mixing vessel small quantities of arsenic sulfid, $As_2S_3$, with tin sulfid, $SnS$, etc., may be added. This material, when fresh, dissolves very readily and helps to join the free sulfur to the fibers of the wood but its use is not necessary as the free sulfur itself joins closely with the fiber.

I claim as my invention:

The process of treating wood which consists in impregnating the same while contained in a closed vessel with ammonium polysulfid then drawing oxygen through the wood, and finally drying the wood at a high temperature.

In testimony whereof I have hereunto set my hand in presence of two subscribing witnesses.

KONSTANTIN KOENMAN.

Witnesses:
L. L. TOWNSHEND,
R. W. BISHOP.